UNITED STATES PATENT OFFICE.

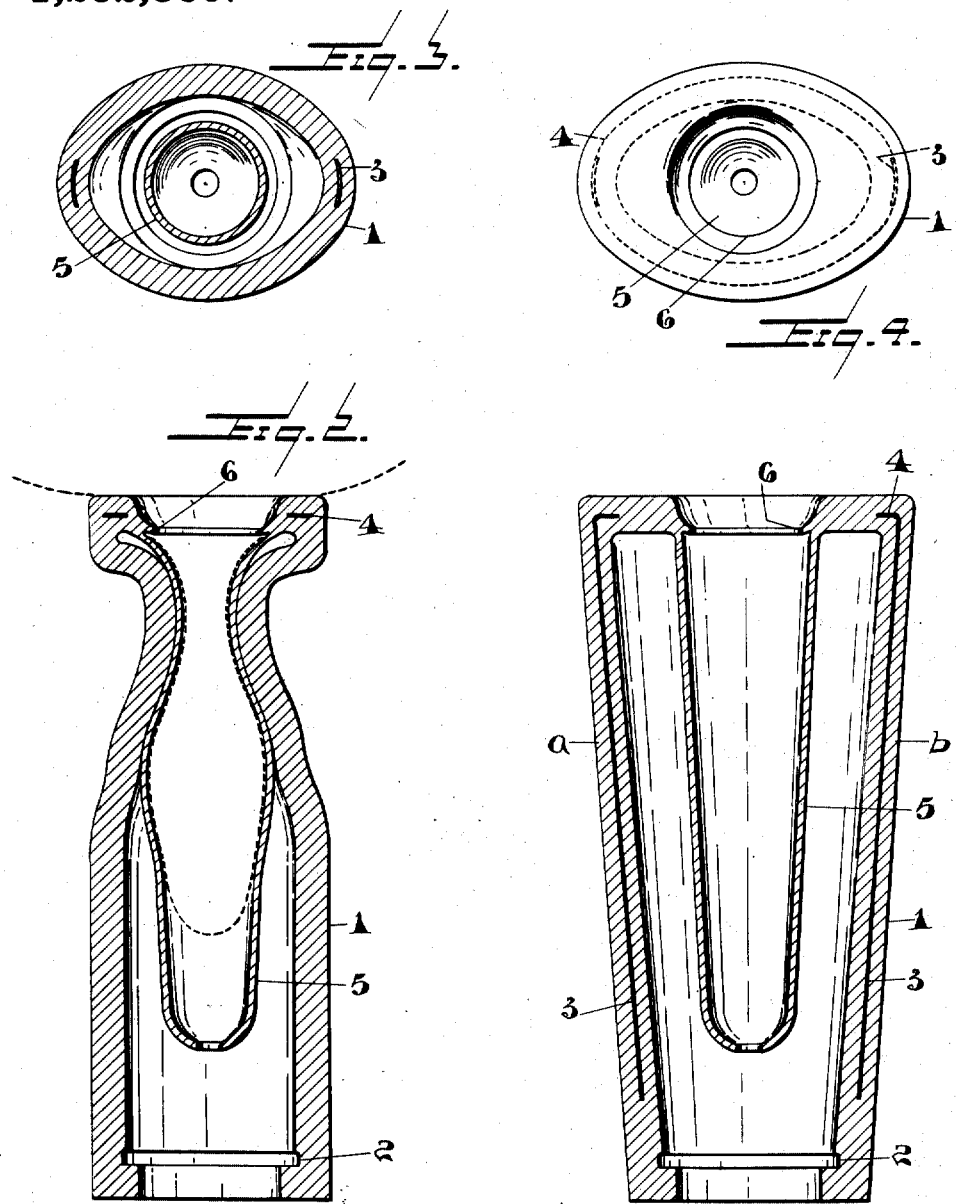

HENRY W. TERRY AND JOHN W. FOWLER, OF TORONTO, ONTARIO, CANADA.

TEAT-CUP.

1,252,860.   Specification of Letters Patent.   Patented Jan. 8, 1918.

Application filed September 15, 1916. Serial No. 120,391.

*To all whom it may concern:*

Be it known that we, HENRY WILLIAM TERRY and JOHN WILLIAM FOWLER, of the city of Toronto, in the county of York, Province of Ontario, Canada, have invented certain new and useful Improvements in Teat-Cups, of which the following is a specification.

This invention relates to teat cups of the type in which the cup is designed to collapse progressively, when subjected to sub-atmospheric pressure, from the top toward the bottom, and our object is to devise a cup of this kind in which squeezing action of the cup will take effect as far up as possible on the cow's teat and in as short a time as possible after sub-atmospheric pressure is created therein, and in which the necessary flexing of the teat cup is reduced to a minimum.

We attain our objects by means of the constructions hereinafter described and illustrated in the accompanying drawings in which—

Figure 1 is a longitudinal section of our improved teat cup;

Fig. 2 a similar view taken at right angles to Fig. 1, showing the teat cup partly collapsed;

Fig. 3 a cross section on the line $a$—$b$ in Fig. 1; and

Fig. 4 a plan view of the teat cup.

In the drawings like numerals of reference indicate corresponding parts in the different figures.

1 is the teat cup, preferably made of rubber or other flexible, airtight and waterproof material. The upper end of this cup has an opening to receive a cow's teat, while the lower or discharge end has an internal groove 2 formed therein for engagement with the connection of a suitable discharge and suction pipe, with which, of course, a vacuum producing device is connected as is usual in milking machines.

Extending longitudinally of the teat cup at each side is a stiffening strip 3, which may be made of any suitable stiff material such as a strip of metal, or the sides of the cup may be otherwise reinforced or stiffened at opposite sides to render the cup non-collapsible longitudinally along diametrically opposite lines. Preferably also the stiffening is continued through the head, the preferable mode of stiffening being to employ a metal ring 4 integral with the strips 3.

It is necessary that the cup be adapted to collapse progressively from the udder end to the discharge end when sub-atmospheric pressure is produced therein. Toward this end several features of construction contribute. In the first place the walls are progressively decreased in thickness from the lower end toward the top, being therefore more readily deformed at the top than at the bottom. The effect is further materially enhanced by giving the cup an ellipsoidal form in cross section adjacent the udder end, the relatively flat arches of the wall at the udder end of the cup making the wall at this point much less resistive to outside atmospheric pressure than adjacent the discharge end. The cup being substantially circular at the discharge end and gradually flattening toward the udder end, the stiffness of the arches of the wall progressively decreases from the discharge end to the udder end.

The arrangement of the cup so that it collapses from diametrically opposite sides is of great importance in the operation of the device. Each wall in collapsing moves in but a short distance and its point of contact with the teat is therefore as close to the udder as it is possible to get it. The compression of the teat is therefore between two inwardly moving surfaces which grip it as close as possible to the udder. The action in milking is thus made as effective as that of the calf in sucking or the human hand in milking in the ordinary way. Owing to the small amount of movement required by each wall, the teat cup takes effect as early as is possible in the suction stroke of the suction apparatus used in connection with the device.

The flattening of the teat cup to ellipsoidal form at the udder end not only facilitates the milking operation as hereinbefore described, but also tends to prolong the life of the cup, as the bending of the rubber of the sides from its normal position during suction is much more gradual than would be the case if the circular form were employed.

We prefer to use in connection with the teat cup the internal sheath 5, which is connected with the teat cup only at the udder end of the same, as shown in Figs. 1 and 2.

To insure an air tight fit with the teat and also to provide means tending to prevent the teat cup being accidentally pulled from the teat, we provide inside the opening at the udder end of the teat cup above the connection with the sheath 5 an inwardly directed annular flange 6. This flange is preferably directed somewhat downwardly as shown. The flange offers no obstruction to the fitting of the teat cup on to the teat in the ordinary way by the suction of the apparatus. At the same time it resists accidental displacement of the teat cup as its tendency is to dig into the external surface of the teat and to straighten up under strain so as to tend to dig in more deeply in proportion to the increased strain. The effect, however, is not so pronounced as to seriously interfere with the removal of the teat cup when the milking operation is complete.

By constructing the teat cup as hereinbefore described, we satisfactorily attain the objects of our invention as set out in the preamble to this specification.

What we claim as our invention is:—

1. A collapsible teat cup having a narrow longitudinal stiffening embedded therein at each side whereby it is collapsible from each side between the lines of stiffening, said stiffening being entirely separate at the lower parts of the cup.

2. A collapsible teat cup having a narrow longitudinal stiffening embedded therein at each side and annular stiffening embedded in the top whereby the cup is collapsible from each side between the lines of stiffening, said longitudinal stiffenings being entirely separate at the lower parts of the cup.

3. A teat cup adapted to collapse progressively from the udder end to the discharge end and provided with a sheath connected to the cup at the udder end, and an annular somewhat downwardly directed flange within its opening just above the point of connection with the teat.

4. A collapsible teat cup provided with a teat sheath connected thereto at the udder end and said cup having a narrow longitudinal stiffening embedded therein at each side whereby it is collapsible from each side between the lines of stiffening, said stiffening being entirely separate at the lower part of the cup.

Signed at Toronto, Canada, this 2nd day of Sept. 1916.

HENRY W. TERRY.
JOHN W. FOWLER.

Witnesses:
L. Mae Lewis,
N. R. Tyndall.